March 4, 1969   R. B. FREEMAN   3,430,539
PNEUMATIC TOOL

Filed Nov. 2, 1967   Sheet 1 of 2

INVENTOR.
RICHARD B. FREEMAN
BY
ATTORNEYS.

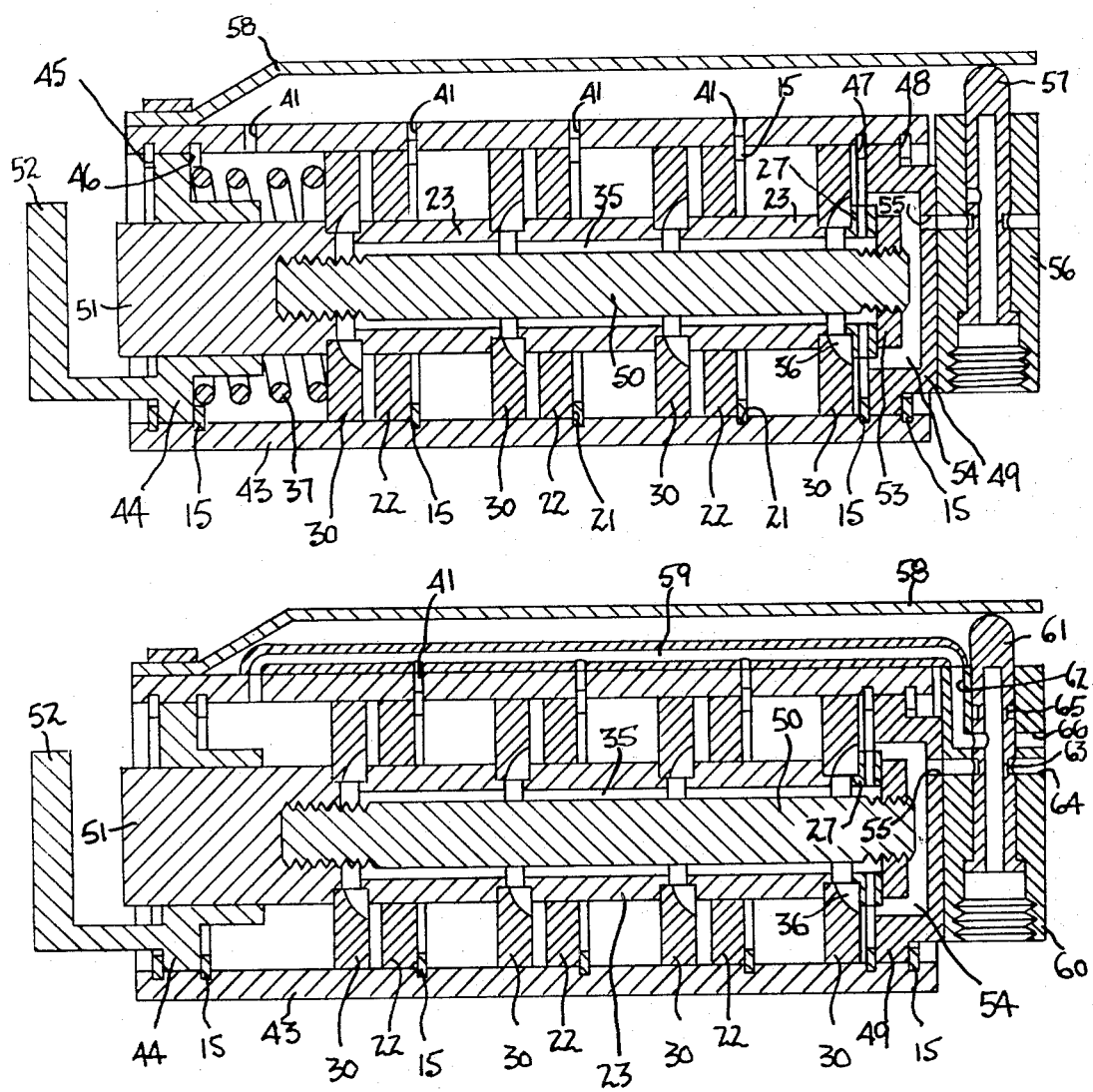

United States Patent Office 3,430,539
Patented Mar. 4, 1969

3,430,539
PNEUMATIC TOOL
Richard B. Freeman, Shaker Heights, Ohio, assignor to Scovill Manufacturing Company, Waterbury, Conn., a corporation of Connecticut
Continuation-in-part of application Ser. No. 597,997, Nov. 30, 1966. This application Nov. 2, 1967, Ser. No. 680,199
U.S. Cl. 91—411                         3 Claims
Int. Cl. F15b *11/22, 13/06;* F01b *7/04*

ABSTRACT OF THE DISCLOSURE

The tool comprises a pressure-holding body in which a plurality of pistons are movably mounted to be displaced as a unit in response to pressurized air directed into the cylinder. Floating baffle plates partition the pressure body into chambers which communicate with individual air ports leading to a common central manifold. The device can be single acting in response to air pressure, with a spring return, or it can be double acting to utilize the air pressure both for advance and retraction of the piston assembly. The device has utilization, for example, as a blind rivet tool or as a clinching tool.

---

This application is a continuation-in-part of my application Ser. No. 597,997, filed Nov. 30, 1966 and entitled "Blind Rivet Tool."

DISCLOSURE

In my copending application, above referred to, I have disclosed a blind rivet tool which is pneumatically operated and utilizes a multiple piston and baffle plate arrangement, with multistage shock absorption to minimize impact wear and shock to the tool upon sudden release of the load. The present invention is directed in general to a pneumatic tool of simplified construction and form having an improved tie rod securement for the piston assembly and an improved manifold air porting assembly for directing air into the multiple chambers of the tool.

Other objects and advantages of the invention will become apparent during the course of the following description.

In the drawings, in which like reference numerals designate like parts throughout the same, FIG. 1 is a longitudinal cross-sectional view of a pneumatic tool embodying the features of my invention.

FIG. 4 is a longitudinal cross-sectional view, similar to that of FIG. 1, showing a modified form of the invention.

FIG. 5 is a longitudinal cross-sectional view, similar to FIG. 1, but showing another modified form of the invention.

Figure 1:
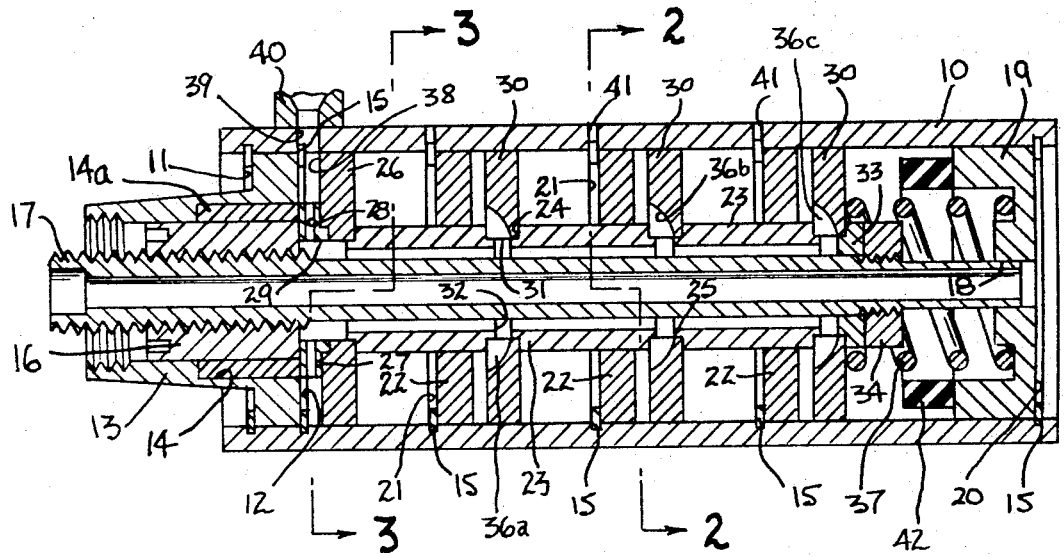
Figure 3:
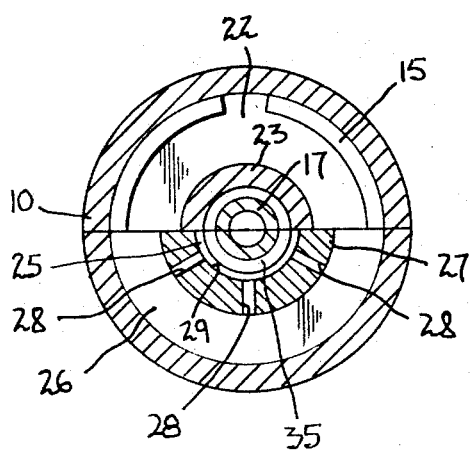
FIG. 3 is a transverse cross-sectional view, taken as indicated on line 3—3 of FIG. 1.
Figure 2:
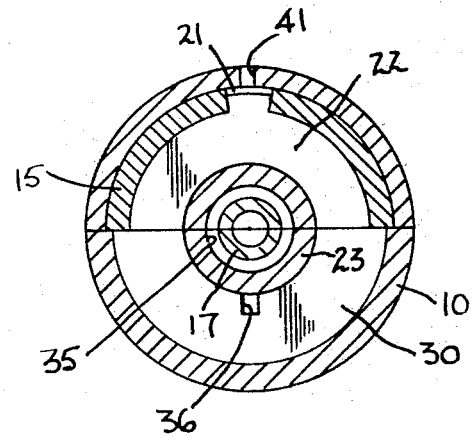
FIG. 2 is a transverse cross-sectional view, taken as indicated on line 2—2 of FIG. 1.

Referring more particularly to FIGS. 1–3 of the drawings, I have shown a hollow cylindrical body or pressure cylinder 10 which is provided, adjacent one end thereof with a pair of internal circumferential or annular recesses 11 and 12. An internally threaded flanged fitting 13, having an internal counterbore 14, is secured in place within the end of the cylinder 10 by means of split retainer rings 15 which are accommodated in the longitudinally spaced recesses 11 and 12. A sleeve bearing 14a is mounted in the counterbore 14 to slidably accommodate an internally threaded sleeve nut 16 which is threadedly secured to an outwardly projecting portion of a hollow tie rod 17. The tie rod extends centrally through the cylinder body 10 and has its opposite end slidably received in a bore 18 of a spring support element 19 which is retained against outward displacement from the body by means of a split retainer ring 15 which is accommodated in an internal annular recess 20 adjacent the rearward end of the body 10.

Intermediate its ends, the body is provided with a series of uniformly spaced internal annular recesses 21, each of which accommodates one of the split retainer rings 15 to limit forward displacement of a baffle plate 22 which is slidably mounted within the cylinder so that one of such baffle plates is disposed rearwardly of each one of said annular recesses 21. Each of the baffle plates 22 is traversed by a hollow cylindrical spacer element 23 which is of larger internal diameter than the external diameter of the tie rod 17. Each end of each spacer element 23 is circumferentially recessed to provide an external shoulder portion 24 and a short extension 25 of reduced diameter.

The piston assembly is assembled in coaxial relationship to the tie rod 17 by mounting a front piston 26 between a front spacer element 27 and the end of one of the spacer elements 23. The spacer element 27 abuts the end of the sleeve nut 16 and is provided with a plurality of air passageways 28 which extend from the outer periphery of the spacer element 27 to the interior of the central opening 29 provided therein.

Each of the rearward pistons 30 is secured between adjacent and opposite ends of a pair of spacer elements 23 so as to be disposed rearwardly of a companion baffle plate 22. Each of the pistons 30, as well as the front piston 26, is provided with a central opening 31 to receive the extensions 25 of the spacer elements 23, which are spaced from each other to define an annular passageway 32 within the opening 31 when the spacer elements are in clamped position in relation to the pistons. This same annular passageway 32 for the rearmost piston 30 is defined by a flanged spacing element 33 which underlies a nut 34 threadedly secured to the tie rod 17 so as to bring the pistons 26 and 30 and the spacer elements 23, 27 and 33 into clamped securement against the base provided by the sleeve nut 16, thus providing a longitudinally extending annular air passageway 35 between the outside diameter of the tie rod 17 and the inside diameter of the coaxially mounted hollow spacer elements 23.

The forward face of each of the pistons 30 is provided with a plurality of angularly extending recesses 36 which radiate outwardly from the central opening 31 in each of the pistons to a point on the surface of the piston which is radially outwardly of the outside diameter of the spacer sleeves 23. Preferably, the cross-sectional area of these recesses 36 should be progressively increased in the respective pistons 30 so that the recesses 36a in the forwardmost piston 30 will be of one predetermined width to provide a certain desired cross-sectional area, whereas the recesses 36b in the next rearward piston 30 will be somewhat wider than the recesses 36a to provide an increased cross-sectional area, and the recesses 36c in the rearmost piston 30 will be further increased in width over the recesses 36b, so as to provide recesses of still greater cross-sectional area.

A compression coil spring 37 is seated in the spring support element 19 and engages the rear face of the rearmost piston 30 so as to bias the piston assembly forwardly. The front spacer element 27 abuts the fitting 13 to limit the forward thrust of the piston assembly. This spacer element 27 also serves to maintain the front piston 26 in longitudinaly spaced relationship to the interior face of the fitting 13. The space 38, thus provided, communicates with an opening 39 in the wall of the cylinder body 10, which opening in turn communicates with the interior of a fitting 40 which is secured exteriorly of the cylinder body 10. The fitting 40 is adapted to be connected to a source of compressed air through any suitable valve control mechanism, not shown, which may be of the type disclosed in the above-referred to copending application, which will direct air into the cylinder body in one position of the valve and permit air to exhaust from the cylinder body when the valve is released to an off or inoperative position. Additionally, a vent opening 41 is provided in the wall of the cylinder body 10 adjacent each of the recesses 21, and there is sufficient clearance between the tie rod and the central opening in the spring support element 19 to also permit venting through that central opening.

A resilient shock absorber ring 42 is secured to an internal face of the spring support element 19 for a purposed to be described. It will be understood that the forward portion of the tie rod 17 may have any suitable form of load-engaging mechanism secured thereto, such as, for example, the blind rivet engaging device disclosed in my aforementioned copending aplication. It will also be understood that O-rings or other suitable sealing means can be provided on the tool to prevent leakage of air between slidably moving parts, wherever is deemed necessary.

THE OPERATION OF THE TOOL

In its at rest or inoperative position, the piston assembly is yieldably maintained in its forwardmost position, as shown in FIG. 1, by the action of the compresison coil spring 37. Assuming that the tool is engaged with a workload and that it is desired to perform the necessary work by retraction of the piston assembly, compressed air is directed into the cylinder body 10 through the opening 39, so as to enter the annular space 38 within the cylinder body. The air passages 28 in the front spacer element 27 permit the free passage of the compressed air through the front spacer element and into the longitudinally extending air manifold defined by the annular passageway 35. The compressed air exits from the manifold through the annular passageways 32 into the piston recesses 36a, 36b and 36c. The compressed air is trapped between the rear face of each baffle plate 22 and the adjacent face of its companion piston 30, thus causing the piston assembly to be displaced rearwardly relatively to the baffle plates by actuation of the compressed air and causing the tie rod 17 to be retracted. Any air which lies rearwardly of the piston 26 or the two forwardmost pistons 30 will be vented to atmosphere through the vent openings 41. Any air which lies behind the rearmost piston 30 will be vented to atmosphere through the spring support element 19.

As soon as the piston assembly has retracted sufficiently to perform the necessary work, as in a blind riveting operation, the load on the piston assembly is suddenly relieved to cause an abrupt, accelerated movement of the piston assembly in a rearward direction, where it is arrested by the shock absorber ring 42. Inasmuch as the baffle plates 22 are slidably mounted on the spacers 23, the baffle plates will ordinarily be retained by the compressed air in abutment with their respective retaining rings 15 during the retractive movement of the piston assembly.

The piston assembly will remain in its rearmost or fully retracted position until the incoming air pressure is released. The coil spring 37, which has been compressed by the retractive movement, then causes the piston assembly to move forwardly within the cylinder while the entrapped air is permitted to exhaust through the suitable valve mechanism.

It will be noted that, in contrast to prior art devices of the multiple piston type, in which the actuating air must travel from one expanding chamber sequentially to the next and so on, in my device each of the expanding piston chambers is served directly with air from a common manifold, without being dependent upon the transfer of air from one chamber to another. By utilizing piston recesses 36 which are of progressively larger cross-sectional area in the pistons which are more remote from the main source of air supply, any tendency of the remoter pistons to receive less actuating air than the nearer pistons, is readily compensated for and overcome.

By using the split retainer rings to hold the respective components in position on the cylinder body 10, I have obviated the need for any special or complex casting or fabrication for the cylinder body and can economically utilize simple round tubing or pipe for the pressure cylinder. The tie rod arrangement of securing and integrating the piston assembly serves to provide the necessary manifold air passageway while at the same time eliminating the need for welding or other costly securement techniques which would increase the cost of manufacture of the tool, as well as making the entire tool assembly operation more difficult and expensive.

MODIFIED FORM OF FIG. 4

In FIG. 4 of the drawings, I have shown a modified form of the invention in which I utilize the same principles above-described for a forward-acting pneumatic tool, in contrast to the rearward-acting tool disclosed in FIG. 1 of the drawings. Such a forward-acting tool might be utilized, for example, for a clinching or crimping operation wherein forward motion of the tool relatively to the workload is desired.

Referring to FIG. 4 of the drawings, I have shown a hollow cylindrical body 43 having a combination tool guide and anvil member 44 secured in the forward end thereof by means of the split retainer rings 15 mounted in the properly spaced retainer recesses 45 and 46. The opposite end of the cylinder 43 is provided with the suitably spaced retaining recesses 47 and 48 in which are received the split retaining rings 15 by means of which a fixed baffle plate 49 is secured to this end of the cylinder 43.

As in the previously described form of FIG. 1, a plurality of baffle plates 22 are mounted within the cylinder 43 and retained against displacement in one direction by the split retaining rings 15 mounted in the respective annular retaining recesses 21 of the cylinder. A plurality of pistons 30 are provided for association with the baffle plates 22 and 49 and are assembled in spaced relationship by means of the spacer elements 23 and 27, as previously described.

A tie rod 50 extends coaxially through the spacer elements 23 to define the longitudinally extending annular air manifold 35 with which the branch passageways 32 and the piston passages 36 communicate. The floating baffle plates 22 are traversed by the spacer elements 23, as in the manner previously described.

To the forward threaded end of the tie rod 50 is threadedly secured a hammer rod or block 51 which slidably traverses the tool guide 44 and projects toward a workpiece support arm or anvil 52 which extends forwardly from the tool guide member 44. A nut 53 is threadedly secured to the opposite end of the tie rod 50 so as to clamp the piston assembly between the nut 53 and the hammer block 51. The forward surface of the fixed baffle plate 49 is centrally recessed, as at 54, to provide a clearance space for the rearwardly projecting nut 53, as well as to provide a passageway by means of which compressed air can communicate with the longitudinally extending manifold passageway 35. An air passageway 55 traverses the baffle plate 49 and provides communication between the recess 54 and the port of a valve body 56 which is secured to the baffle plate 49. A two-position valve 57, of conventional character, brings the port of the valve body into communication with a source of compressed air when the valve is depressed manually by means of the spring arm 58 which is secured to the exterior of the cylinder 43 in overlying relationship to the valve for convenience in actuating the valve.

Compressed air then enters the recess 54 through the passageway 55 and then through the angular recesses 36 of the rearmost piston 30 into the longitudinally extending air manifold 35. From the manifold, the air passes through the separate branch openings 32 and the respective piston recesses 36 to cause expansion between the opposed faces of the respective pairs of pistons and baffle plates, whereby the piston assembly is displaced in a forward direction relatively to the cylinder 43. This forward movement of the hammer block 51, or other appropriate tool, causes the tool to exert pressure on any suitable workpiece which may be disposed adjacent to the anvil 52 and will cause the necessary work to be performed. When the valve 57 is released, the air pressure causes it to retract and shut off the incoming compressed air flow, while at the same time permitting the compressed air in the cylinder 43 to exhaust through the valve to atmosphere. The compression coil spring 37 which is disposed between the forwardmost piston 30 and the interior face or surface of the tool guide 43, serves to return the piston assembly to its inoperative position.

Thus the form of forward-acting tool, shown and described with reference to FIG. 4 of the drawings, embodies the same improved principles of structure and operation as were previously described with reference to the rearward-acting embodiment of the invention described with reference to FIG. 1 of the drawings.

THE MODIFIED FORM OF FIG. 5

The tool structure illustrated in FIG. 5 of the drawings is, in most respects, essentially similar to that previously described with reference to FIG. 4. However, in the embodiment of FIG. 5, the compression coil spring 37 is eliminated and, in lieu of effecting retraction of the tool by that means, I have provided means for accomplishing the retraction of the tool by directional porting of the compressed air.

Instead of permitting the previously described vents 41 in the wall of the cylinder 43 to exhaust to atmosphere, each of these vents is brought into communication with a manifold air passageway 59 which, as shown, is provided exteriorly of the cylinder body 43 but could, if desired, be provided in the body wall. A modified form of valve body 60 and valve 61 are provided.

The valve 61 will normally direct the compressed air into the passageway 62 in the valve body which, in turn, causes the air to enter the return manifold 59 from where it enters through ports 41 into the cylinder 43. This causes the piston assembly to be displaced rearwardly ahead of each of the baffle plates and, during such displacement, the entrapped air is vented to atmosphere by means of an annular recess 63 on the valve 61 which communicates with an exhaust port 64 in the valve body.

When it is desired to actuate the tool, the valve 61 is depressed to a second position whereby the compressed air is directed into the air passageway 55 in the manner previously described, so as to cause the piston assembly to advance forwardly. Any air which is trapped between a piston and the baffle plate which is forward of it, exhausts through the respective vent openings 41, into the return manifold 59, around an annular recess 65 on the valve, which is now in registry with the return passageway 62, and to atmosphere through an exhaust port 66 in the valve body 60.

After the work has been accomplished, the valve is released and is returned to its former position by the air pressure, thus again causing retraction of the piston assembly.

Although this form of the invention has been described as having each of the return chambers in communication with the return manifold 59, it will be understood that the compressed air return or retraction of the piston assembly can be accomplished by directing the compressed air through passageway 62 into less than all of the multiple chambers, if desired. In such event, those chambers which are not subjected to the compressed air return would simply be vented to atmosphere through the vent openings 41 in the manner previously described with reference to FIG. 4.

It is to be understood that the forms of my invention, herewith shown and described, are to be taken as preferred examples of the same, and that various changes may be made in the shape, size and arrangement of the parts thereof, without departing from the spirit of the invention or the scope of the subjoined claims.

Having thus described my invention, I claim:

1. In a fluid-pressure operated power tool, the combination of a pressure cylinder providing a plurality of pressure chambers, each of said chambers having a piston movably associated therewith, axially-aligned hollow spacer elements maintaining said pistons in predetermined longitudinally-spaced relationship, a tubular tie rod traversing said chambers coaxially of said spacer elements and interconnecting said pistons to provide a unitarily movable piston assembly, a fluid-inlet port associated with said cylinder, the exterior of said tubular tie rod and the interior of said spacer elements defining a manifold fluid passageway between said inlet port and each of said chambers, the interior of said tie rod defining a central open-ended conduit isolated from said fluid passageway and having its opposite ends open to ingress and egress exteriorly of said pressure cylinder, means for selectively directing a pressure fluid into said inlet port to cause displacement of said piston assembly in one direction of movement, return means acting upon said piston assembly to displace it in the opposite direction of movement when said first displacement pressure is relieved, and a load-engaging member carried by said piston assembly and movable therewith.

2. In a fluid-pressure operated power tool, the combination of a pressure cylinder, a plurality of baffle plates slidably mounted within said cylinder to provide a plurality of pressure chambers, an internal annular recess provided in said cylinder adjacent each of said slidable baffle plates, a resilient retainer element positioned in each of said annular recesses to limit movement of its adjacent baffle plate, each of said chambers having a piston movably associated therewith, hollow spacer elements maintaining said pistons in predetermined longitudinally spaced relationship, a tie rod traversing said chambers and interconnecting said pistons to provide a unitarily movable piston assembly to slidably traverse said baffle plates, a fluid-inlet port associated with said cylinder, said tie rod and said spacer elements defining a manifold fluid passageway between said inlet port and each of said chambers, said manifold fluid passageway being movable with said piston assembly relatively to said baffle plates and said cylinder, means for selectively directing a pressure fluid into said inlet port to cause displacement of said piston assembly in one direction of movement, return means acting upon said piston assembly to displace it in the opposite direction of movement when said first displacement pressure is relieved, and a load-engaging member carried by said piston assembly and movable therewith.

3. In a fluid-pressure operated power tool, the combination of a pressure cylinder providing a plurality of pressure chambers, each of said chambers having a piston movably associated therewith, hollow spacer elements maintaining said pistons in predetermined longitudinally spaced relationship, a tie rod traversing said chambers and interconnecting said pistons to provide a unitarily movable piston assembly, a fluid-inlet port associated with said cylinder, said tie rod and said spacer elements defining a manifold fluid passageway between said inlet port and each of said chambers, each of said pistons being progressively more remote from said fluid-inlet port, each of said pistons having a fluid passageway communicating between said manifold passageway and one of said chambers, the cross-sectional flow area of said piston fluid passageways being progressively larger in each of said pistons in relation to the progressive remoteness of the piston from said fluid inlet port, means for selectively directing a pressure fluid into said inlet port to cause displacement of said piston assembly in one direction of movement, return means acting upon said piston assembly to displace it in the opposite direction of movement when said first displacement pressure is relieved, and a load-engaging member carried by said piston assembly and movable therewith.

References Cited

UNITED STATES PATENTS

| | | |
|---|---|---|
| 825,866 | 7/1906 | Rogers. |
| 2,383,082 | 8/1945 | Rossmann _____ 92—151 XR |
| 2,546,596 | 3/1951 | Haines. |
| 2,981,234 | 4/1961 | Appleton _____ 92—110 XR |
| 2,983,256 | 5/1961 | Seeloff _____ 92—151 XR |
| 3,023,675 | 3/1962 | Stephan _____ 92—151 XR |

EDGAR W. GEOGHEGAN, *Primary Examiner.*

U.S. Cl. X.R.

60—97; 92—111, 151